United States Patent Office 3,174,889
Patented Mar. 23, 1965

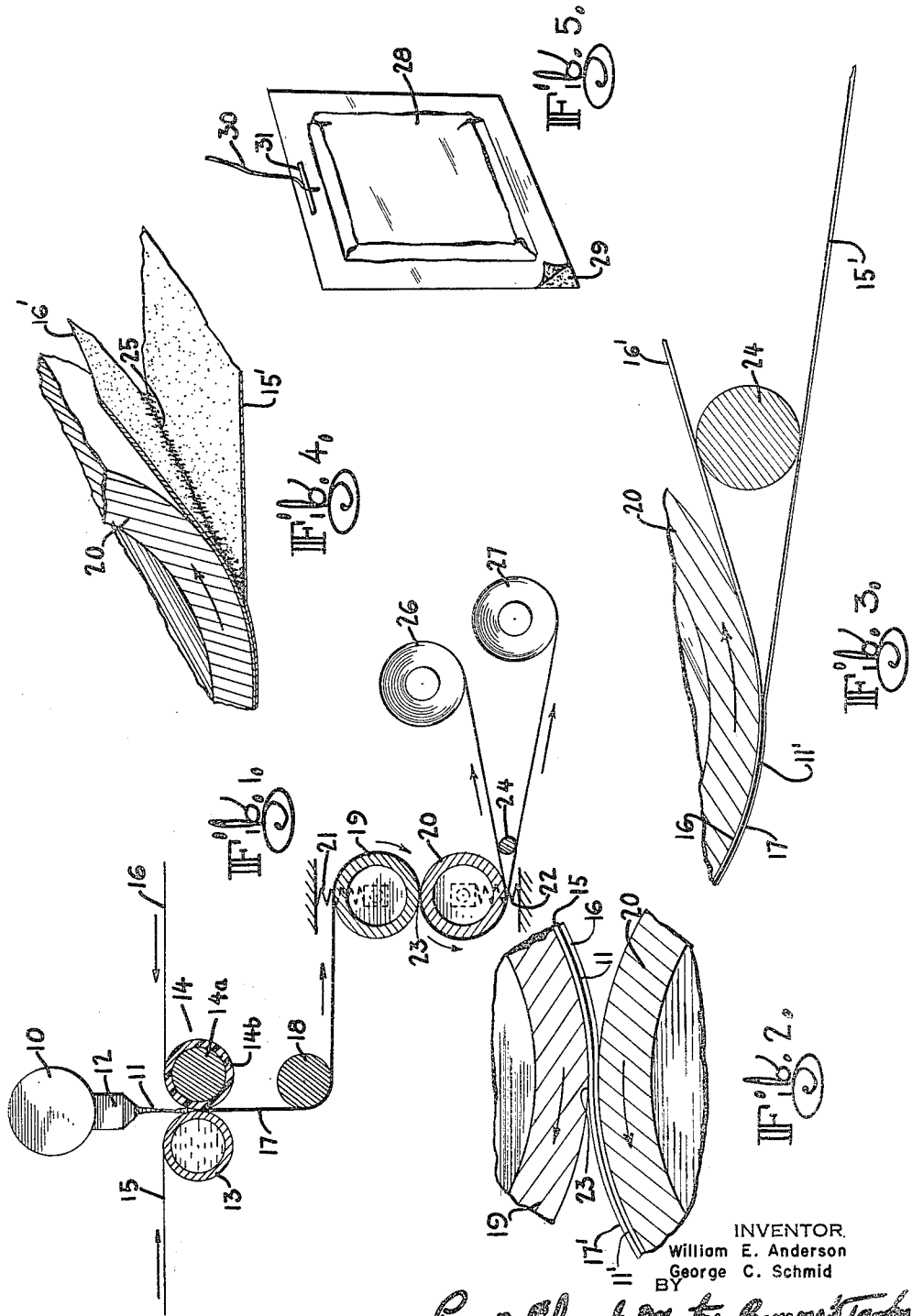

3,174,889
METHOD OF MAKING A POROUS COATED PRODUCT
William E. Anderson and George C. Schmid, Blooms-
bury, N.J., assignors to Riegel Paper Corporation, New
York, N.Y., a corporation of Delaware
Filed Feb. 18, 1957, Ser. No. 640,726
4 Claims. (Cl. 156—254)

The present invention is concerned with the coating of base materials, and more particularly to the coating of a porous base material with a normally impervious material, to provide a laminated product having most, if not all, of the porosity of the base material.

More specifically, the present invention deals with the coating of porous base materials with a layer of normally impervious material, such as plastic, to impart a desired characteristic to at least one surface of the base material, while substantially, at least, retaining the desirable porosity characteristics of the base material.

One aspect of the invention relates to the coating of thin paper tissue, known as tea bag tissue, with a layer of polyethylene or similar plastic material, to the end that the coated surfaces are rendered heat-sealable, while at the same time the porosity of the tissue is substantially or entirely retained. In this respect, the invention encompasses an improved article of manufacture, as well as an improved method for making the article.

A related aspect of the invention concerns the coating of fabric materials with polyethylene or the like, to the end that desired surface characteristics are imparted to the fabric, while the porosity thereof is retained. By way of example, a fabric material coated with polyethylene, in accordance with the invention, provides a composite material useful in the manufacture of gloves or other articles having desirable wearing qualities.

In general, the method of the invention involves forming a thin layer of polyethylene or similar material between opposed webs of porous base material, reducing the thickness of the intermediate layer and impregnating the base material by the application of heat, and in some cases, pressure, and separating the webs of base material to split the intermediate layer and render the same porous. The new method simultaneously provides two webs of coated material having a porosity equal or substantially equal to that of the porous base material. The coated layer is such, however, that the coated surface of the base material has desired properties, such as heat-sealability, resistance to wear, etc.

In connection with the processing of tea bag tissue, and other material, in accordance with the invention, substantial advantages are realized, in that it is possible to apply to the base web material a coating of polyethylene or the like of a relatively minute thickness, and less by one-half than could be applied by conventional methods. Thus, conventional plastic extrusion equipment is limited as to the thinness of the layer of material which may be extruded therefrom by various factors, including the character of the extruded material. For example, in the extrusion of polyethylene, it is difficult, if not impossible, to extrude a layer thinner than about 1/15 to 2/15 mil (1#–2# per ream). However, in accordance with the new method, a layer of minimum thickness may be laminated between two layers of base web material, and when the base webs are subsequently separated each is coated with a porous layer containing an amount of material which is about one half that of the original minimum layer.

Another advantageous aspect of the new method resides in the production of coated material may be realized to production under prior methods, using apparatus of substantially the same capacity. Thus, with a single plastic extrusion machine, it is possible to simultaneously form two coated base webs in the same period of time that has been required heretofore to form a single coated layer.

In the manufacture of tea bag tissue, the method of the invention results in further advantages, particularly in that the base web of tissue, when coated with a porous layer of polyethylene, exhibits a substantial increase in so-called string pull strength. Accordingly, it is possible to reduce the amount of wet strength binder present in the base web tissue by as much as one-half, without sacrifice in the wet strength of the final product. In this respect, the invention resides, in part, in the provision of an improved product comprising a coated tea bag tissue in which the percentage of the wet strength binder has been materially reduced.

For a better understanding of the invention, reference should be made to the following detailed description and accompanying drawings, in which:

FIG. 1 is a schematic representation of an apparatus for coating materials in accordance with the invention;

FIG. 2 is an enlarged fragmentary section view illustrating the nip of heated pressure rolls incorporated in the apparatus of FIG. 1;

FIG. 3 is an enlarged fragmentary view, in section, of web separating means used in the apparatus of FIG. 1;

FIG. 4 is an enlarged fragmentary perspective view illustrating the separation of webs as shown in FIG. 3; and FIG. 5 is a perspective view of an article, such as a tea bag, formed in accordance with the invention.

In the new method, separate webs of porous base material are brought together, and a thin layer of coating material is interposed therebetween. The sandwich-like laminated web thus formed is then heated and passed through the nip of a pair of pressure rolls, whereby the intermediate layer is compressed. The nipping operation reduces the thickness of the intermediate layer to a very small dimension and simultaneously forces the material of the intermediate layer into the base material to assure intimate bonding. Subsequently, and prior to cooling, the webs of base material are split apart, and the material of the intermediate layer, having a bond strength with the base material in excess of its cohesive strength, separates substantially along a center plane between the webs of base material.

As the base webs are separated, the action of the intermediate layer material, in being drawn apart, is such that minute openings are left in the surface of the intermediate material. Thus, in accordance with the invention, while the laminated web, before separation, is substantially or completely non-porous, the operation of separating the the base webs is effective in forming coated webs, the porosity of each of which is substantially equal to the original porosity of the base material.

Advantageously, the coating material is applied to the base webs by more or less conventional extrusion methods, after which the base webs are caused to be impregnated with the coating material. The base webs are then drawn apart, in the presence of heat, and the separate coated webs are rolled up, being allowed to cool somewhat before rolling to cause the coated material to solidify. It is contemplated that the separation or delamination of the base webs in the presence of heat may be accomplished by separating the webs immediately after extrusion of the coating material thereon, or at some later stage after reheating the laminated product to the desired temperature.

Referring now to the drawing, the numeral 10 designates an extruding device, of conventional design, adapted to extrude a thin vertical web 11 of polyethylene or similar material. Spaced below the outlet 12 of the extruder are rolls 13, 14 mounted for rotation on parallel horizontal axes. In the illustrated apparatus, one of the rolls, 13, is a hollow metal roll having means associated therewith for supplying a cooling medium, such as water, thereto. The opposing roll, 14, has a metal core 14a covered with an outer layer 14b of silicone, rubber, natural or synthetic rubber, or similar material. Rolls 13, 14, which may be considered the extruder rolls, form a nip directly below the extruder outlet 12.

Passing over the tops of the respective extruder rolls, and through the nip thereof, are separate webs 15, 16 of base material which, in accordance with one aspect of the invention, may be porous tea bag tissue. The webs 15, 16 pass from suitable supplies thereof, such as rolls, not shown, and may extend horizontally toward the rolls 13, 14, in tangency with the upper peripheral portions thereof.

As shown in FIG. 1, as the base webs 15, 16 turn downwardly about the extruder rolls 13, 14 and pass through the nip thereof, the descending film of polyethylene flows between the base webs immediately in advance of the roll nip. Advantageously, the thickness of the polyethylene film 11 is such that an intermediate layer thereof is formed which has a thickness of about ⅕ mil, equal to about three pounds of the polyethylene material per ream of the laminate. It will be understood, however, that the thickness of the extruded intermediate layer may be varied in accordance with the nature of the base web materials and in accordance with the desired end use of the final product. Thus, in the improved tea bag tissue, the amount of material in the coated layer in the final product (approximately one-half in amount of the coating material as extruded) should be sufficient to provide proper heat-sealability. On the other hand, the thickness of the extruded film should not be so great as to preclude the opening of pores in the layer upon delamination of the base webs. Practical experience, in connection with the manufacture of polyethylene coated tea bag tissue, indicates that a minimum of about ¼ to ½ lb. (equivalent to a thickness of about 1/60 to 1/30 mil) of polyethylene per ream (24" x 36" x 500) must be carried by a tissue web to obtain adequate heat-sealability. The maximum amount that may be employed without precluding the obtaining of satisfactory porosity is about 3 to 3½ lbs. (equivalent to a thickness of about ⅕ to ¼ mil) per ream. Of course, with different materials, such as certain fabrics, it is possible to utilize a 30 lb. coating without destroying the porosity of the final product.

In the illustrated form of the invention, the extruder rolls 13, 14 are maintained at a relatively low temperature, so that the base webs 15, 16 are chilled somewhat by contact therewith prior to passing through the nip, and the polyethylene film is solidified shortly after its contact with the base webs. As the sandwich-like laminate of base webs and intermediate film passes through the nip of the extruder rolls 13, 14, some pressure is applied to the laminate to at least partially bond the materials together.

As the laminated web 17 emerges from the nip of the extruder rolls 13, 14 it is directed downwardly and passed around an idler roll 18. The web 17 then travels horizontally from the idler roll 18 and is brought into contact with an upper peripheral portion of the first roll 19 of a pair 19, 20 thereof.

In the illustrated form of the invention, the rolls 19, 20 are heated, as by steam, to a temperature in the order of 300–400° F. and are urged into pressure contact with each other by means such as springs 21, 22. The laminated web 17 is brought into contact with the roll 19 at a point spaced circumferentially of the nip 23 defined by the rolls 19, 20, and is caused to pass around a portion of the periphery of the roll 19 before passing through the roll nip 23.

In passing around the surface of the roll 19, the laminated web 17 becomes heated, and the intermediate layer 11 of polyethylene becomes softened. Accordingly, when the web 17 passes through the roll nip 23, the intermediate layer 11 is compressed and a portion of the material thereof is forced into the respective base webs 15, 16, substantially as indicated in FIG. 2.

The web 17' emerging from the roll nip 23 has an intermediate layer 11' which is very thin; and while the exact character of the intermediate layer 11' is not known, it is believed that it is sufficiently thick to entirely cover the opposing surfaces of the base webs 15, 16, but not substantially in excess of such thickness.

Advantageously, the web 17', emerging from the nip 23, is passed in contact with the heated surface of the lower roll 20 for a predetermined circumferential distance, such as 180°. This maintains the polyethylene intermediate layer in a softened condition, care being taken, however, by appropriate relation of temperatures, web speed and roll diameter, to avoid overheating.

In accordance with the invention, after the nipped web 17' has passed in contact with the lower heated roll 20, it is drawn away from the roll, and the individual base webs 15, 16 are separated, or delaminated, by passing the webs over opposite sides of a separator bar 24. As shown more clearly in FIG. 4, when the base webs 15, 16 are separated, the soft or semi-soft polyethylene material forming the intermediate web or layer splits apart, whereby separated webs 15', 16' are formed, each having one surface coated with a layer of polyethylene of relatively minute thickness.

As one of the outstanding features of the invention, the action of the intermediate polyethylene layer in separating, as along the line 25 (FIG. 4), is such that the openings in the porous base webs 15, 16 are cleared, and the coated webs 15', 16' are porous substantially to the extent of the original material. It is not clearly understood just why this phenomenon occurs, but one possible explanation is that there is a picking action as the cohesively bonded intermediate layer is split, which results in the withdrawing of minute portions of the material from pores of one base web by material adhering to the other base web. Another possible explanation is that the intermediate material shrinks and thereby leaves openings about the natural openings in the base material.

While it is presently contemplated that the method of the invention may be carried out advantageously by separating or delaminating the individual base webs 15, 16 in the presence of heat and pressure, it should be understood that delamination may take place in the absence of pressure where the intermediate layer of coated material is properly bonded to the base webs. Thus, as a general rule, the lamination of the base webs and coating material which takes place at the rolls 13, 14 does not produce an adequate bond between the separate layers, particularly where one of the rolls (such as roll 13) is maintained at a relatively low temperature. In such cases, it is desirable to pass the laminated webs through the nip 23 in the presence of heat, to insure a uniform and adequate bond between the various layers of the laminate.

Likewise, reheating of the laminated webs 15, 16 may be avoided if delamination is effected at or adjacent the extruder rolls 13, 14, before the intermediate layer of coating material is permitted to cool. In this respect, when using polyethylene as an intremediate coating material, the intermediate layer should be at a temperature of at least about 250° at the instant of delamination.

As indicated in FIG. 3, delamination of the base webs takes place shortly in advance of the separator bar 24, so that some cooling of the intermediate material takes place prior to the passing thereof over the bar. Suitable coiling or rolling means, no shown, are located an appropriate distance beyond the separator bar 24, affording ample time for the coated webs to cool before being wound into coils 26, 27.

One of the most advantageous applications of the new method is in the manufacture of tea bags. Heretofore, the preparation of tea bags has required that the fragile porous tea bag tissue be carefully stitched along its edges, in order to form a suitable enclosure for a measured quantity of tea. In accordance with the present invention, however, the porous tea bag tissue may be first coated with a layer of heat-sealable plastic material, without substantial loss of porosity, and, in the manufacture of the tea bags, the edges of the bags may be heat sealed by efficient techniques well known in the art. The heat-seal operations are, of course, much more economically carried out than stitching operations, and provide a more satisfactory bag structure.

In the making of the improved tea bag tissue, the invention contemplates utilizing conventional tea bag tissue as the base webs 15, 16, and providing an intermediate three pound (per ream) layer of polyethylene. By way of example, a laminated web, formed of such materials, may be passed at a speed in the order of 45 ft./min. over and through the nip of rolls heated to a temperature in the order of 300–400° F. The laminated web is held in contact with the heated rolls for approximately 1.4 seconds, and delamination takes place immediately thereafter.

As mentioned heretofore, the thickness of the coating layer applied in the manufacture of the improved tea bag tissue may be varied within certain limits. The lower limit is determined by the ability of the coated layer to provide an adequate heat seal, and has been found to be in the order of ½ lb. to ¼ lb. per ream. The upper limit is determined by the porosity characteristic of the coating layer after delamination and has been determined to be in the order of 3 to 3½ lbs. per ream.

Laboratory tests indicate that base tea bag tissue having a normal porosity of in the order of 115–120 (ft.$^3$/min./ft.$^2$ of air at ½″ water), when processed in accordance with the invention, has an average porosity of the same order as the original base material and has good heat-seal properties. This is highly suitable for commercial tea bag manufacture, since the porosity of the improved product is equal to that of conventional tea bags and tea bag tissue. Moreover, standard tea infusion tests indicate that the infusion characteristics of the new product are substantially better than the prescribed standard for the industry.

As shown in FIG. 5, an improved tea bag 28 may be made by placing two layers of the coated tissue with their coated surfaces in face-to-face relation (as at 29). The edges of the bag are secured together by the application of heat and pressure, in a conventional manner, to form an enclosure for a measured quantity of tea. The bag may be formed of separate sheets of coated tissue, as indicated in FIG. 5, or by folding a single sheet in the middle and sealing three sides thereof.

A completed bag generally has a string 30 attached thereto, by a staple 31, for example; and, in this respect, the improved bag evidences a substantially increased "string pull strength," as compared to bags of conventional design.

Various taste tests conducted using polyethylene coated tea bag tissue indicates that the polyethylene imparts no objectionable taste or aroma to the tea. This of course, is one of the most important requirements of a tea bag material.

In connection with the manufacture of tea bag tissue in accordance with the invention, important advantages are realized in the improvement of the wet strength of the tissue upon the coating thereof with a porous layer of polyethylene or similar material. It has been shown that the percentage of wet strength binder in the base web tissue may be reduced by a factor of about one-half without sacrifice of desirable wet strength characteristics. Thus, in general, conventional tea bag tissues require 1 to 2 percent wet strength binder such as urea resin, while in accordance with the invention, the percentage of such binder may be reduced to about ½ to 1 percent. Substantial savings are thus realized since the wet strength binder represents one of the more expensive components of the base tissue.

An advantage of substantial commercial importance realized by the present invention resides in the fact that the production of tissue may be doubled, as compared to production under conventional procedures, without increasing the capacity of the basic apparatus and without requiring additional factory floor space.

It is to be understood that the improved method is not limited in its scope of the exact procedure described. For example, it is contemplated that one or both of the separate base webs may be separately coated, brought together in the presence of heat, and then delaminated. Likewise, it is contemplated that the extruder rolls 13, 14 may be heated, with delamination being effected immediately upon emergence of the laminated web therefrom. However, from a practical standpoint, with present commercially available extruding equipment, it is considered undesirable to heat the extruder rolls, because of the difficulties occasioned upon the breakage of the base webs, permitting the extruded material to come into direct contact with the extruder rolls.

Nor is the invention limited in its scope to the making of coated tea bags and tea bag tissue. Rather, the contemplated scope of the invention includes the coating, by the new method, of fabrics and other porous materials where, in the end material, substantial porosity is desired. Further, in this respect, the method of the invention contemplates the lamination and subsequent delamination of unlike base materials, one of which, even, may be of a non-porous character.

The coating of various fabrics in accordance with the invention may be carried out to impart desirable characteristics to the fabric while substantially retaining the original porosity thereof. Thus, in the manufacture of heavy duty work gloves, for example, fabric such as canvas cloth may be coated with a material such as nylon to render the fabric highly wear resistant, while retaining the desirable porosity characteristics thereof. By way of example, a canvas cloth provided with a 30 lb. per 3000 ft.$^2$ porous coating of nylon has desirable qualities for use as a glove material.

Accordingly, reference should be made to the following appended claims in determining the full scope of the invention.

We claim:

1. A method of making a porous coated paper product, comprising the step of forming a laminate consisting of two layers of porous paper webs and an intermediate film of polyethylene, while said film is in a softened and tacky condition, and thereafter pulling the two paper webs apart while the polyethylene is in a heated softened condition to leave portions of the polyethylene film adhered to each paper web.

2. The method of claim 1, in which said porous paper webs are formed of tea bag tissue, and said polyethylene film adhering to each web has a weight in the range of ¼ pound to 3½ pounds per ream.

3. A method of making a porous coated product, comprising forming a laminate consisting essentially of two layers of porous web material and an intermediate film of normally non-porous thermoplastic material, the said laminate being formed while said thermoplastic material is in a softened and tacky condition, and thereafter pulling the two webs apart while the thermoplastic material is in a heat-softened condition to leave portions of the thermoplastic material adhered to each web, the character of the thermoplastic material and the porous webs being such that the bond strength of the thermoplastic material with the paper webs exceeds the cohesive strength of the thermoplastic material while said thermoplastic material is in a heat-softened condition, and the weight and character of the thermoplastic material being such that, upon the pulling apart of the webs in the presence of heat, minute openings are formed in the normally non-porous thermoplastic material which extend through to the porous web material to provide a pair of highly porous coated webs.

4. The method of claim 3, in which said normally non-porous thermoplastic material is polyethylene.

References Cited by the Examiner

UNITED STATES PATENTS

| | | |
|---|---|---|
| 1,323,022 | 11/19 | Crowell et al. |
| 2,407,549 | 9/46 | Gurwick _____ 154—46 |
| 2,498,197 | 2/50 | Baxter. |
| 2,576,276 | 11/51 | Berglund. |
| 2,714,571 | 8/55 | Irion et al. |
| 2,745,141 | 5/56 | Brennan. |
| 2,768,902 | 10/56 | Scholl _____ 154—120 XR |
| 2,801,736 | 8/57 | Grow _____ 99—77.1 XR |
| 2,817,596 | 12/57 | Schur. |
| 3,121,657 | 2/64 | Magill _____ 156—244 XR |

FOREIGN PATENTS 670,655  4/52  Great Britain.

EARL M. BERGERT, *Primary Examiner.*

REUBEN LEIBOWITZ, CARL F. KRAFFT,
*Examiners.*